United States Patent [19]

Majetich et al.

[11] Patent Number: 5,783,263
[45] Date of Patent: Jul. 21, 1998

[54] PROCESS FOR FORMING NANOPARTICLES

[75] Inventors: Sara Majetich; Michael McHenry; Joseph Artman, all of Pittsburgh; Stuart Staley, Hidden Valley, all of Pa.

[73] Assignee: Carnegie Mellon University, Pittsburgh, Pa.

[21] Appl. No.: 658,788

[22] Filed: Jun. 5, 1996

Related U.S. Application Data

[60] Division of Ser. No. 265,008, Jun. 24, 1994, Pat. No. 5,549,973, which is a continuation-in-part of Ser. No. 85,298, Jun. 30, 1993, Pat. No. 5,456,986.

[51] Int. Cl.$^6$ .................................................. H01T 14/00
[52] U.S. Cl. .......................... 427/580; 427/216; 427/598
[58] Field of Search .................................. 427/598, 216, 427/580

[56] References Cited

U.S. PATENT DOCUMENTS

| | | | |
|---|---|---|---|
| 3,661,567 | 5/1972 | Yamamoto | 420/434 |
| 3,976,519 | 8/1976 | Kubo et al. | 148/120 |
| 4,042,429 | 8/1977 | Kojima et al. | 148/314 |
| 4,043,845 | 8/1977 | Dionne | 148/105 |
| 4,133,703 | 1/1979 | Kojima et al. | 148/314 |
| 4,187,170 | 2/1980 | Westcott et al. | 209/1 |
| 5,049,540 | 9/1991 | Park et al. | 505/1 |
| 5,127,586 | 7/1992 | Oder | 241/24.14 |
| 5,176,260 | 1/1993 | Oder | 209/212 |
| 5,248,498 | 9/1993 | Neumann et al. | 424/9.36 |
| 5,304,366 | 4/1994 | Lorents et al. | 423/445 B |
| 5,456,986 | 10/1995 | Majetich et al. | 428/403 |
| 5,548,748 | 8/1996 | Ruoff et al. | 428/323 |

OTHER PUBLICATIONS

Rodney S. Ruoff, Donald C. Lorents, Bryan Chan, Ripudaman Malhotra, Shekhar Subramoney; *Single Crystal Metals Encapsulated in Carbon Nanoparticles*; Science, vol. 259, Jan. 15, 1993, pp. 346–348.

Masato Tomita, Yanachi Saito and Takayoshi Hayashi ; *LaC$_2$ Encapsulated in Graphite Nano–Particle*; Jpn. J Appl. Phys. vol. 32 (1993), pp. L280–L282; Part 2, No. 2B, Feb. 15, 1993.

B. Diggs, A. Zhou, C. Silva, S. Kirkpatrick, N. T. Nuhfer, M. E. McHenry, D. Petasis, S. A. Majetich, B. Brunett, J. O. Artman and S. W. Staley; *Magnetic Properties of Carbon–Coated Rare–Earth Carbide Nanocrystallites Produced by a Carbon Arc Method*; J. Appl. Phys. 75(10), May 15, 1994, 1994 American Institute of Physics, pp. 5879–5884.

E. M. Brunsman, R. Sutton, E. Bortz, S. Kirkpatrick, K. Midelfort, J. Williams, P. Smith, M. E. McHenry, S. A. Majetich, J. O. Artman, M. DeGraef and S. W. Staley; *Magnetic Properties of Carbon–Coated, Ferromagnetic Nanoparticles Produced by a Carbon–Arc Method*; J. Appl. Phys. 75(10), May 15, 1994, 1994 American Institute of Physics, pp. 5882–5884.

M. E. McHenry, S. A. Majetich, J. O. Artman, M. DeGraef and S. W. Staley; *Superparamagnetism in Carbon–Coated Co Particles Produced by the Kratschmer Carbon Arc Process*; 1994 The American Physical Society, vol. 49, No. 16, pp. 11 358–11 363, ( no month avail.).

(List continued on next page.)

*Primary Examiner*—Bernard Pianalto
*Attorney, Agent, or Firm*—Kilpatrick & Lockhart LLP

[57] ABSTRACT

A metal or alloy nanoparticle is provided which exhibits hysteresis at room temperature having a carbon coating. The nanoparticle has a diameter in the range of approximately 0.5 to 50 nm, and may be crystalline or amorphous. The metal, alloy, or metal carbide nanoparticle is formed by preparing graphite rods which are packed with the magnetic metal or alloy or an oxide of the metal or alloy. The packed graphite rods are subjected to a carbon arc discharge to produce soot containing metal, alloy, or metal carbide nanoparticles and non-magnetic species. The soot is subsequently subjected to a magnetic field gradient to separate the metal, alloy, or metal carbide nanoparticles from the non-magnetic species.

26 Claims, 4 Drawing Sheets

OTHER PUBLICATIONS

J. Svoboda; *Magnetic Methods for the Treatment of Minerals*; Elsevier Science Publishers B. V. (Amsterdam, The Netherlands); Distributors for the United States and Canada: Elsevier Science Publishing Company, Inc. (New York, NY); Elsevier Science Publishers B. V., 1987; ISBN 0-444-42811-9 (vol. 8), ISBN 0-444-41804-0 (Series), pp. 3, 4, (no date avail.).

MM. Merrill E. Jordan, Harvey M. Cole, William C. Burbine and David L. Petterson; *Pigments Noirs Carbonés Magnétiques Améliorés Et ProcédéDe Production Perfectionné De Ces Pigments*; Brevet D'Invention; Bulletin officiel de la Propriété industrielle, n° 15 de 1964, pp. 1–6, (no month avail.).

P. Byszewski, R. Diduszko and M. Baran; *Weak Ferromagnetism of Fe Intercalated Fullerides*; vol. 85 (1994) ACTA Physica Polonica A, No. 2, pp. 297–302, (no month avail.).

P. M. Ajayan, T. W. Ebbesen, T. Ichihashi, S. Iijima, K. Tanigaki and H. Hiura; *Opening Carbon Nanotubes with Oxygen and Implications for Filling*; Nature, vol. 362, Apr. 8, 1993, pp. 522–525.

C. Guerret–Piécourt, Y. LeBouar, A. Loiseau and H. Pascard; *Relation Between Metal Electronic Structure and Morphology of Metal Compounds Inside Carbon Nanotubes*; Nature, vol. 372, 22/29 Dec., 1994, pp. 761–765.

Supapan Seraphin, Dan Zhou, Jun Jiao, James C. Withers, Rauof Loutfy; *Yttrium Carbide in Nanotubes*; Nature, vol. 362, Apr. 8, 1993, p. 503.

S. A. Majetich, J. O. Artman, M. E. McHenry and N. T. Nuhfer, S. W. Staley; *Preparation and Properties of Carbon–Coated Magnetic Nanocrystallites*; 1993 The American Physical Society, vol. 48, No. 22, pp. 16–845–16 848.

I. S. Jacobs and C. P. Bean (General Electric Research Laboratory); *Fine Particles, Thin Films and Exchange Anisotropy (Effects of Finite Dimensions and Interfaces on the Basic Properties of Ferromagnets)*; pp. 271–350 (No date avail.).

Ami E. Berkowitz and Eckart Kneller; *Magnetism and Metallurgy*; Academic Press, vol. 1, 1969, pp. 365–471, (No month avail.).

*Electronic Structure of Metals Affects Ability to Fill Nanotubes*; Science/Technology Concentrates, Chemical and Engineering News, Jan. 2, 1995 p. 20.

X. Guo, X. Chen, Z. Altounian, J. O. Strom–Olsen, Phys. Rev. B, 46, 14578 (1992) (No month avail.).

PROCESS FOR FORMING NANOPARTICLES

This application is a divisional application of the United States patent application Ser. No. 08/265,008 filed Jun. 24, 1994, U.S. Pat. No. 5,549,973, which is a continuation-in-part application of United States patent application Ser. No. 08/085,298, filed Jun. 30, 1993, now U.S. Pat No. 5,456,986 issued Oct. 10, 1995.

BACKGROUND OF THE INVENTION

1. Field of the Invention

The present invention relates to the field of metal, alloy, or metal carbide compounds and carbon-coated magnetic metal alloy or metal carbide compounds. Particularly, the present invention relates to the field of carbon-coated metal, alloy, or metal carbide nanoparticles and the methods for preparing the same. Nanoparticles include crystalline or amorphous particles 0.5 to 50 nanometers in diameter and nanotubes up to 1 centimeter long and 0.5 to 50 nanometers in diameter.

2. Description of the Prior Art

Small magnetic particles have many applications. Such articles are used as toner in xerography, in ferrofluid vacuum seals, in nuclear magnetic resonance imaging as contrast agents, and in magnetic data storage. These magnetic particles are typically micron-sized in diameter or larger. The large size of these particles renders them less than satisfactory for several specialized applications.

If the magnetic particles were smaller, cost reduction by reducing the number of processing steps would be achieved in xerographic applications. In ferrofluid applications, the enhanced solubility due to carbon coating provided by smaller particles may be advantageous. In magnetic data storage, high density may be enhanced by using smaller particles. Moreover, in magnetic ink applications, the carbon coating and ability to disperse the nanoparticles in aqueous solutions may provide advantages for wetting and coating. Consequently, there is a potential need for sub-micron sized metal, alloy, or metal carbide particles and a method for producing bulk amounts of these particles in a high yield process. In order to improve operation in magnetic data storage applications, it is desirable for the magnetic particles to exhibit hysteresis. Even more desirable is the exhibition of hysteresis at room temperatures.

Recently, there has been increased investigation regarding the Kratschmer-Huffman carbon arc method of preparing fullerenes, or small hollow carbon clusters. These fullerenes are typically in the order of 1 nm in diameter. Recently, it has further been discovered that these hollow carbon clusters can be filled with metal ions. This can be accomplished by drilling out the graphite rods and packing them with a mixture of metal oxide powder and graphite cement before generating the soot by the carbon arc. Rodney S. Ruoff, Donald C. Lorents, Bryan Chan, Ripudaman Malhotra, and Shekhar Subramoney, *Science*, Vol. 259, p. 346 (1993) discussed the production of 20-40 nm diameter carbon-coated lanthanum carbide nanocrystallites by this method. Similar results were reported by Masato Tomita, Yahachi Saito and Takayoshi Hayashi in *Jpn. J. Appl. Phys.*, Vol. 32, p. 280 (1993).

The carbon arc method of preparing lanthanum carbide nanocrystallites discussed above generates fullerenes and graphitic soot in addition to the lanthanum carbide nanocrystallites. In order to be useful, a means of separating the nanocrystallites is essential. So far, no chemical methods have been found to be successful in separating macroscopic amounts of nanoparticles from graphitic soot and fullerenes. Such separation processes are rendered extremely important when the yields achieved for the nanoparticles is in the order of ten percent or less of the soot. Accordingly, there is a need for a method to separate metal, alloy, or metal carbide nanoparticles from graphitic soot.

SUMMARY OF THE INVENTION

In Application Ser. No. 08/085,298, filed Jun. 30, 1993, a modification of the Kratschmer-Huffman carbon arc method was used to form carbon coated nanoparticles having a diameter in the range of approximately 0.5 to 50 nm. It has now been found that if a magnetic rare earth metal, alloy or metal or alloy oxide is packed into a graphite rod and subsequently subjected to a carbon arc discharge, soot containing metal, alloy, or metal carbide nanoparticles and non-magnetic species is formed. The metal, alloy, or metal carbide nanoparticles can be separated from the soot by subjecting the soot to a magnetic field gradient.

In the magnetic separation step, the nanoparticle-containing soot is ground to a fine powder and then dropped down an electrically grounded metal tube through a magnetic field gradient created by a pair of strong magnets. Non-magnetic material passes through the tube, but magnetic components are suspended if the field gradient force exceeds the gravitational force. When the apparatus is moved away from the magnets, the magnetic material is released into its own separate collection container. This process can be used to separate paramagnetic or ferromagnetic species from non-magnetic components of the soot produced by the carbon arc discharge process.

Theories of monodomain magnetic particles predict that the blocking temperature, i.e., the temperature above which metastable hysteretic behavior is absent, depends on the product of the particle volume and the magnetocrystalline anisotropy constant for the material, K. The alloys manganese aluminum carbide ($Mn_3AlC$), τ-phase manganese aluminide (MnAl) and several samarium cobalt ($SmCo_x$) phases are ferromagnetic in bulk form and have large anisotropy constants. The magnetization as a function of the applied field and temperature for the different alloy nanoparticles indicates that monodomain magnetic particles of these alloys exhibit room temperature hysteresis.

DETAILED DESCRIPTION OF THE PREFERRED EMBODIMENTS

Figure 1:
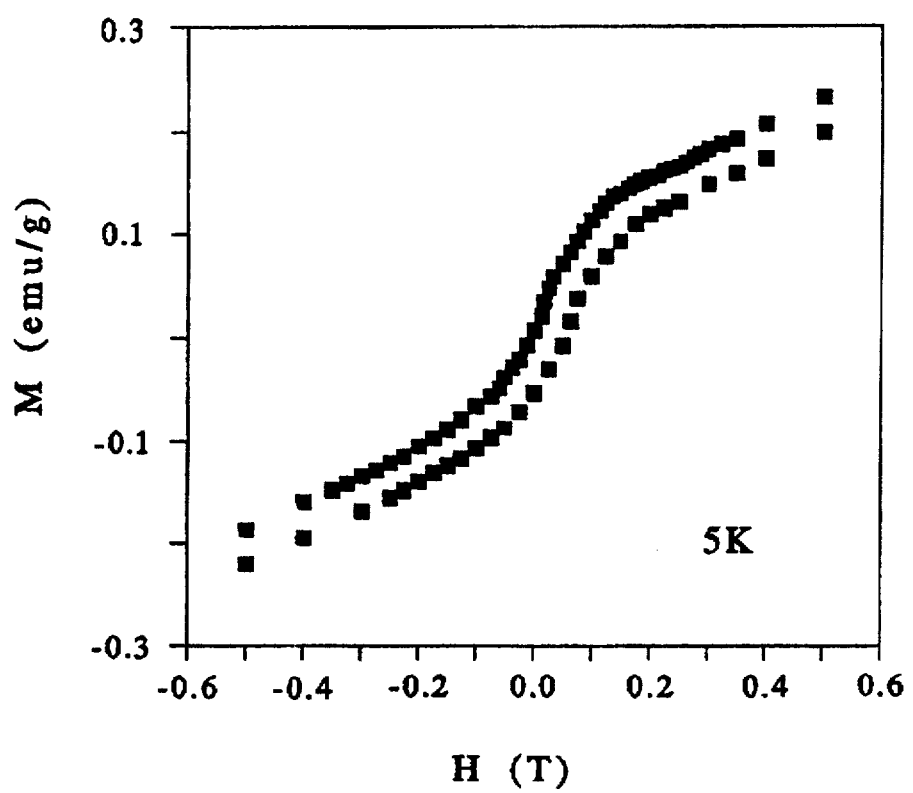
FIG. 1 is a SQUID magnetometer measurement of M(H, T) for a 30 mg nanocrystalline manganese-aluminum-carbide specimen formed in accordance with the present invention.

A process based on the Kratschmer-Huffman carbon arc method of preparing fullerenes can be used to generate carbon-coated metal, alloy, or metal carbide nanoparticles. When combined with a magnetic field gradient separation technique, bulk amounts of these nanoparticles can be isolated.

If graphite rods which are packed with a magnetic rare earth metal, alloy or metal or alloy oxide are subsequently subjected to a carbon arc discharge, the soot produced by the Kratschmer-Huffman carbon arc process contains metal, alloy, or metal carbide nanoparticles and non-magnetic species. The graphite anode is hollowed out and packed with a mixture of metal, alloy, or metal or alloy oxide and graphite cement. In the arc, metal-containing clusters form. The cluster stoichiometry depends on the chemistry between the metal atoms, carbon, and oxygen. The clusters diffuse until they are deposited on a surface, either the high temperature cathode or the room temperature walls of the reactor. The nanocrystalline phases produced depend on the surface temperature and the cooling rate of the clusters determined by their diffusion path and the amount of helium buffer gas. This method is therefore useful in preparing metastable phases. The carbon coating arises when the particles cool. Since graphite melts at a higher temperature than the metals or metal carbides, phase segregation occurs in the cooling nanoparticle, forming a graphitic shell. The coating in some cases prevents degradation of air or water-sensitive compounds, a problem encountered with important magnetic materials such as $Nd_2Fe_{14}B$.

A magnetic field gradient can be used to separate the metal, alloy, or metal carbide nanoparticles from the non-magnetic species included in the soot. Preferably, the soot produced by the carbon arc discharge method is further ground to a fine powder before being subjected to the magnetic field gradient. If the magnetic field gradient force is greater than the gravitational force, the magnetic nanoparticles will be suspended by the magnets in the separator tube whereas the non-magnetic species will pass through. This magnetic gradient separation technique removes non-magnetic byproducts of the carbon arc discharge process and enhances the magnetic response of the isolated material. This separation process separates all paramagnetic or ferromagnetic components from the remaining soot.

If the particles are formed from a ferromagnetic material, their size is small enough to support only a single magnetic domain. These particles are said to be superparamagnetic, and all the atomic spins align to yield a large particle moment. The particle moment rotates not through domain wall motion, but by rotating all the atomic spins together. Theories of superparamagnetism show that the temperature dependence of the coercivity, $H_c$, for a spherical particle with a single magnetic domain is govern by the equation:

$$H_c = H_{ci}[1-(T/T_B)]^{1/2}, \quad (1)$$

where $H_{ci}$ is the coercivity at 0° K. and $T_B$ is the blocking temperature. Above the blocking temperature, the particle's magnetic moment can flip due to thermal fluctuations during the time it takes to measure the bulk magnetization, which can be on the order of an hour. Above this temperature, the particle is superparamagnetic and no hysteresis is observed in the time frame of the measurement. Below the blocking temperature, the particle doesn't have enough thermal energy to spontaneously flip its magnetic moment in this time frame, and nonzero coercivity is expected, with the temperature dependence given by equation 1. The energy, E, of the single domain spherical magnetic particle, is:

$$E = V[K \sin^2\theta H M \cos \phi], \quad (2)$$

where V is the particle volume, K is the magnetocrystalline anisotropy, H is the applied field, M is the particle magnetic moment, θ is the angle between the particle moment and the nearest easy axis direction, and φ is the angle between the applied field and the particle moment. In the absence of an applied field, the particle moment will lie along an easy axis to minimize the energy; but in a strong applied field, the moment will align with H. In order to rotate the moment to align with the field, the particle must overcome an energy barrier on the order of KV. Above the blocking temperature, the particle's magnetic moment may switch directions spontaneously due to thermal fluctuations. The blocking temperature may be related to the inverse time for measuring the magnetization, ω; the attempt rate to surmount the barrier, $\omega_0$, which is on the order of the precession frequency of the moment; and the height of the barrier, KV, according to the following relationship:

$$\omega = \omega_0 \exp[-KV/kT_B]. \quad (3)$$

Fine particle magnets may have hysteresis up to a critical temperature, just like their bulk counterparts. However, the physics responsible for the hysteretic behavior is quite different. For monodomain particles, the comparison between the thermal energy and the anisotropy energy is important, while for bulk ferromagnets the comparison between the thermal energy and the exchange energy determines the magnetic behavior.

The present invention can be more readily understood in connection with the following examples wherein alloys having large magnetocystalline anistropy are examined.

EXAMPLE 1

In earlier preparations of elemental and carbide nanocrystals, the reactor conditions were adjusted to control the specific phases made. In order to obtain microscopic chemical homogeneity in the carbon arc, a Mn-Al-O spinel phase starting material was prepared. Stoichiometric quantities of $Mn_2O_3$ and $Al_2O_3$ were mixed, sintered at temperatures on the spinel phase field and quenched to retain the spinel phase, which was characterized by X-ray diffraction and TEM analysis. The spinel phase of variable composition is identified using a Vegard's law dependence of the lattice constant on Mn:Al ratios between the two end compositions. Mn-Al-O was a 2:1 ration was packed in graphite rods used in the carbon arc to generate Mn-Al-C nanoparticles.

Based on the Mn-Al-C phase diagram, only 1–2% carbon dissolves into the alloy, and we anticipated that the metastable phase analogous to the τ-phase of MnAl would also be ferromagnetic. The only other ferromagnetic phase of Mn-Al-C was $Mn_3AlC$, which has a Curie temperature of 15° C. Since the τ-phase is the only known ferromagnetic phase of Mn-Al-C at room temperature, raw soot from different parts of the reactor was tested with a $Nd_2Fe_{14}B$ magnet to quickly optimize the production of this ferromagnetic phase. The best arc conditions were found to be 100 A and 40 V with a 1 mm gap spacing. This led to abundant ferromagnetic material in the pancake region of the deposit which forms on the cathode. Based on a growth model for the nanocrystals made in a carbon arc, both the temperature of the surface and the cooling rate of the alloy cluster before it deposits determines the nanocrystal phase produced. Here the temperature of the cathode is believed to be slightly cooler in the pancake region than in the central core deposit, but the main factor is the difference in the cooling rate of a cluster. Bulk τ-MnAl has been made by melt cooling with a cooling rate of $10^5-10^8$° C./s, of the ε phase, followed by annealing.

The phases present in the sample were determined by several methods. Structural characterization by X-ray diffraction (XRD) indicated the presence of $Mn_3AlC$, γ-Mn, and graphite, but did not show peaks corresponding to the τ-phase. Calibration of the X-ray apparatus indicated that the maximum abundance of the τ-phase without being able to detect it would be on the order of 4 weight percent. Energy dispersive spectroscopy (EDS) was used to determine the Mn:Al relative abundance. Here the electron beam was large enough to excite transitions in several nanocrystals simultaneously. The fact that the ratio ranged from 3:1 to 4:1 over a wide area is consistent with the predominant species seen by XRD. Based on the response to the magnet at room temperature, at least some τ-MnAl-C is present in our samples. However, to test the evidence that a large amount of $Mn_3AlC$ was also present, a sample was placed in a freezer well below the Curie temperature for this phase. It was found that cooling significantly increased the magnetic response.

High resolution TEM showed the particle shape, size, and size distribution. All particles were found to have carbon coatings, and the encapsulated nanoparticles were crystalline. An unusual feature was the presence of elongated as well as spherical particles, but the phases corresponding the different shapes were not assigned. In the elongated particles, typical aspect ratios were on the order of three to one. If these particles are ferromagnetic, than shape anisotropy as well as magnetocrystalline anisotropy would play a role in the magnetic behavior. Both the size (average diameter approximately 20 nm) and the size distribution were similar to that seen in metal and metal carbide materials made by the carbon arc process.

Figure 2:
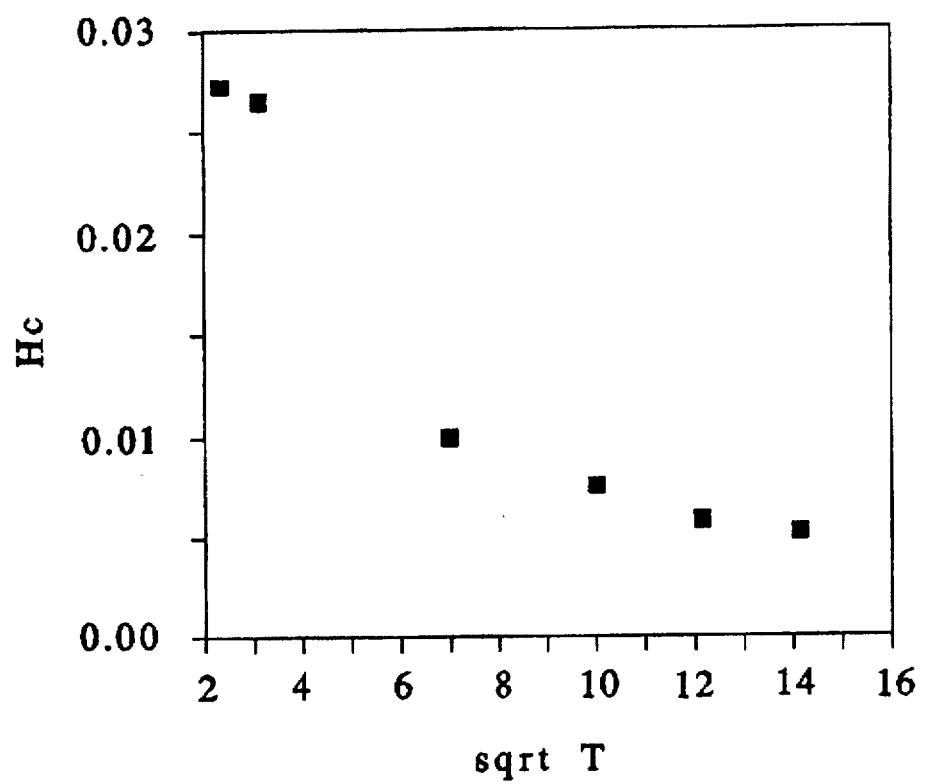
FIG. 2 is a plot of the measured coercivity as a function of $T^{M}$ for the specimen used in FIG. 1.

The magnetization as a function of the applied field and temperature was determined using SQUID magnetometry. For SQUID measurements, approximately 30 mg of platelets from the Mn-Al-C sample were immobilized, so that the nanoparticles would not move in the applied magnetic field. Magnetization curves were measured between 5° and 200° K. and 0 to ±5 T. Hysteresis was observed at all temperatures within this range. The shape of the hysteresis loop in FIG. 1 is indicative of two ferromagnetic contributions with different coercivities, most likely $Mn_3AlC$ and τ-MnAl. The measured coercivity was plotted as function of $T^{1/2}$ in FIG. 2, clearly indicating a departure from the behavior predicated by equation 1. This difference is believed to be due to the presence of multiple components. In this case the saturation magnetization $M_{sat}$, would equal the sum of the two contributions, normalized for relative abundance. The measured coercivity would be intermediate between those for the two components, but the specific value would depend on the shape of the contributing hysteresis loops. The slope of any fit to the date in FIG. 2 cannot be interpreted in terms of a blocking temperature. However, extrapolation of the data suggests that hysteresis would be present at room temperature, a novelty for monodomain magnetic particles.

EXAMPLE 2

Samarium cobalt has multiple stable ferromagnetic phases. In preparing alloy nanocrystals of samarium cobalt in the carbon arc, metallic $Sm_2Co_7$ powder, rather than an oxide material, was used. A strong magnetic response was observed with a $Nd_2Fe_{14}B$ magnet in material from all parts of the reactor. Data was taken from the pancake region of the cathode deposit, the same region studied for Mn-Al-C.

Structural characterization by XRD revealed the presence of $SmCo_5$, $Sm_5Co_2$ fcc Co, and graphite, but not $SM_2Co_7$ or $Sm_2C_{17}$, or samarium carbide phases. EDS indicated a Sm:Co ratio of approximately 1:2 in the sample. The difference between this ratio and that in the starting material may be due to the relatively high vapor pressure of Sm. TEM showed that most particles were approximately spherical, with an average size on 20 nm.

In general, the Curie temperature rises with the proportion of cobalt. While the cobalt Curie temperature was above the detection range, it was expected that $Sm_2Co_7$ (420° C.) and $SmCo_5$ (710° C.) would be observable, even with small increases due to the addition of carbon. However, TMA showed no transitions between 25° C. and 875° C. The addition of carbon has also been shown to increase the Curie temperature by over 260° C. in $Sm_2Co_{17}$ cobalt magnets, and a similar effect may be occurring in $SmCo_5$.

Figure 3:
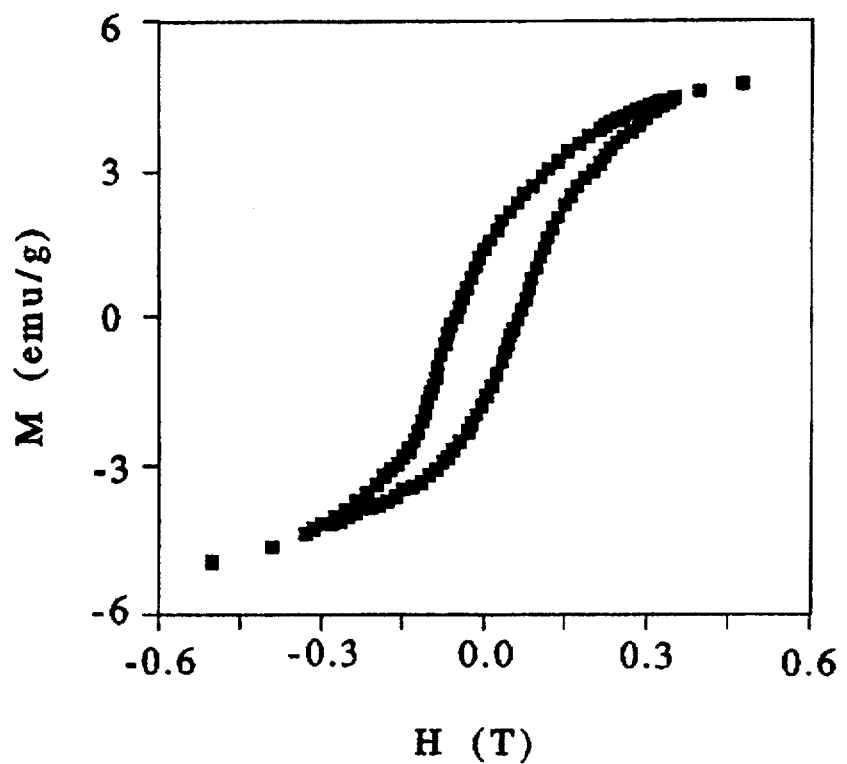
FIG. 3 is a SQUID magnetometer measurement of M(H, T) for a samarium cobalt powder specimen formed in accordance with the present invention.
Figure 4:
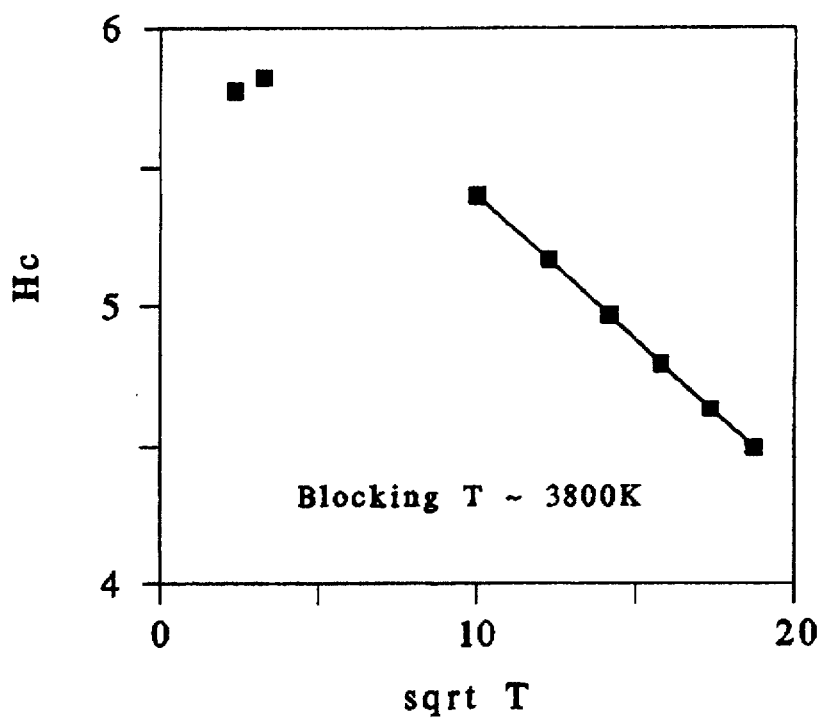
FIG. 4 is a curve showing the coercivity as a function of $T^{M}$ for the specimen used in FIG. 3.

SQUID magnetization measurements were made on powder samples immobilized in epoxy. The hysteresis loops presented in FIG. 3 show a more characteristic shape than for Mn-Al-C, and nonzero coercivity was demonstrated above room temperature. Fitting the temperature dependence of the coercivity to equation 1 as shown in FIG. 4 yielded a blocking temperature of approximately 3800° K., far in excess of the Curie temperature for any samarium cobalt alloy.

The model used to understand the loss of hysteresis above the blocking temperature breaks down above $T_c$ where the exchange coupling between spins on neighboring atoms is disrupted by thermal fluctuations and the particle ceases to have a giant magnetic moment. Above $T_c$, regardless of the calculated blocking temperature, hysteresis will cease to exist.

The phenomenon of nonzero coercivity in monodomain ferromagnets at and above room temperature is real and has potential significance for particulate recording media. Small ferromagnetic particles are commonly used in magnetic recording tapes, but these particles are typically much larger than those discussed in this article. Larger particle sizes have previously been used in order to obtain stability against thermal fluctuations and small changes in the applied field. Stable alloy magnet nanocrystals, such as the $SmCo_x[C]$ particles prepared in a carbon arc, meet the stability requirements with smaller sizes, and are therefore a possibility for higher density data storage medium.

In the foregoing specification certain preferred practices and embodiments of this invention have been set out, however, it will be understood that the invention may be otherwise embodied within the scope of the following claims.

We claim:

1. A method for forming a metal or alloy nanoparticle comprising the steps of:
   a. preparing a graphite rod, said graphite rod being packed with said metal or alloy or an oxide of said metal or alloy;
   b. subjecting said packed graphite rod to a carbon arc discharge to produce soot containing magnetic metal alloy nanoparticles and non-magnetic species; and
   c. applying a magnetic field gradient to said soot to separate said magnetic metal alloy nanoparticles from said non-magnetic species.

2. The method of claim 1 wherein said nanoparticle is one of a ferromagnetic and paramagnetic compound.

3. The method of claim 2 wherein said nanoparticle exhibits hysteresis at room temperature.

4. The method of claim 3 wherein said metal alloy is samarium cobalt.

5. The method of claim 4 wherein said samarium cobalt is in the form of at least one of $SmCo_5$, $Sm_2Co_7$, and $Sm_2Co_{17}$.

6. The method of claim 3 wherein said metal alloy is a manganese-aluminum compound.

7. The method of claim 6 wherein said manganese-aluminum compound is manganese-aluminum-carbide.

8. A method for separating carbon coated magnetic nanoparticles comprising:

forming a mixture of carbon coated magnetic and nonmagnetic nanoparticles by carbon arc discharge;

creating a magnetic field gradient having a magnetic force sufficient to suspend the magnetic nanoparticles when the mixture is passed through the magnetic field gradient;

passing the mixture through the magnetic field gradient to suspend the magnetic nanoparticles and separate the magnetic nanoparticles from the mixture; and, removing the mixture that passed through the magnetic field gradient.

9. The method of claim 8, further comprising:

releasing the suspended magnetic nanoparticles from the magnetic field gradient; and, collecting the released magnetic nanoparticles.

10. The method of claim 9, further comprising repeating said method of claim 8 with the magnetic nanoparticles that were suspended and released from the magnetic field gradient and collected.

11. The method of claim 8, wherein:

said creating a magnetic field gradient comprises positioning a pair of strong magnets near a separator to create a magnetic field gradient within the separator; and, said step of passing further comprises passing the mixture through the separator.

12. The method of claim 11, further comprising separating the magnets and the separator to release the suspended magnetic nanoparticles.

13. The method of claim 8, wherein the magnetic nanoparticles have a magnetic moment, and said method further comprises varying the magnetic field gradient to segregate the magnetic nanoparticles according to the magnetic moment.

14. The method of claim 8, wherein said passing comprises dropping the mixture such that a gravitational force will act on the mixture and pass the mixture through the magnetic field gradient.

15. The method of claim 8, wherein said magnetic nanoparticles exhibit hysteresis at room temperature.

16. A method of producing separated carbon-coated magnetic nanoparticles, comprising the steps of:

subjecting a magnetic metal, alloy or an oxide of a magnetic metal or alloy to a carbon coating process to form a mixture of carbon coated magnetic nanoparticles and nonmagnetic material;

creating a magnetic field gradient having a magnetic force sufficient to suspend the carbon coated magnetic nanoparticles when the mixture is passed through the magnetic field gradient;

passing the mixture through the magnetic field gradient to suspend the carbon coated magnetic nanoparticles and separate the carbon coated magnetic nanoparticles from the mixture; and, removing the mixture that passed through the magnetic field gradient.

17. The method of claim 16, wherein said step of subjecting further comprises the step of grinding the mixture to form a fine powder prior to said step of passing the mixture through the magnetic gradient field.

18. The method of claim 16, wherein the suspended carbon coated magnetic nanoparticles contain an amount of fullerenes, and said method further comprises the steps of:

releasing the suspended carbon coated magnetic nanoparticles from the magnetic field gradient;

collecting the released carbon coated magnetic nanoparticles; and, extracting the fullerenes from the collected carbon coated magnetic nanoparticles.

19. The method of claim 16, wherein the carbon coated magnetic nanoparticles are selected from the group consisting of paramagnetic and ferromagnetic compounds.

20. The method of claim 19, wherein the carbon coated magnetic nanoparticles are selected from the group consisting of the transition metals.

21. The method of claim 20, wherein the carbon coated magnetic nanoparticles are selected from the group consisting of iron, cobalt, nickel, and manganese bismuth.

22. The method of claim 21, wherein the carbon coated magnetic nanoparticles are samarium cobalt.

23. The method of claim 22, wherein samarium cobalt is of the form $SmCo_5$, $Sm_2Co_7$, and $Sm_2Co_{17}$.

24. The method of claim 19, wherein the carbon coated magnetic nanoparticles are manganese-aluminum compounds.

25. The method of claim 24, wherein the manganese-aluminum compounds are manganese-aluminum-carbides.

26. The method of claim 19, wherein the carbon coated magnetic nanoparticles are selected from the group consisting of the rare earth metals except for lanthanum, lutetium and promethium.

* * * * *

UNITED STATES PATENT AND TRADEMARK OFFICE
CERTIFICATE OF CORRECTION

PATENT NO. : 5,783,263 B1
DATED : July 21, 2001
INVENTOR(S) : Majetich et al.

Page 1 of 1

It is certified that error appears in the above-identified patent and that said Letters Patent is hereby corrected as shown below:

<u>Title page,</u>
Item [56], insert the following:

-- FOREIGN PATENT DOCUMENTS
1,357,777    1964    France    C 09 --;

<u>Claim 11,</u>
Line 6, delete "step of";

<u>Column 2,</u>
Line 52, delete "$T^M$" and substitute therefor -- $T^{1/2}$ -- ;

<u>Column 2,</u>
Line 57, delete "$T^M$" and substitute therefor -- $T^{1/2}$ -- ;

<u>Column 3,</u>
Line 62, insert -- + -- before "H M";

<u>Column 5,</u>
Line 36, insert -- ° -- after "O";
Line 36, insert -- ° -- after "5"; and
Line 65, delete "$Sm_2C_{17}$" and substitute therefore -- $Sm_2Co_{17}$ --.

Signed and Sealed this

Thirtieth Day of October, 2001

Attest:

*Nicholas P. Godici*

NICHOLAS P. GODICI
*Attesting Officer*      *Acting Director of the United States Patent and Trademark Office*